US007674089B2

(12) United States Patent
Werner (10) Patent No.: US 7,674,089 B2
(45) Date of Patent: Mar. 9, 2010

(54) DEVICE AND METHOD FOR GUIDING AT LEAST TWO FLOW MEDIA

(75) Inventor: Stefan Werner, Allensbach (DE)

(73) Assignee: Allweiler AG, Radolfzell (DE)

( * ) Notice: Subject to any disclaimer, the term of this patent is extended or adjusted under 35 U.S.C. 154(b) by 809 days.

(21) Appl. No.: 10/576,987

(22) PCT Filed: Oct. 6, 2004

(86) PCT No.: PCT/EP2004/011146

§ 371 (c)(1),
(2), (4) Date: Oct. 12, 2006

(87) PCT Pub. No.: WO2005/047741

PCT Pub. Date: May 26, 2005

(65) Prior Publication Data

US 2007/0132191 A1 Jun. 14, 2007

(30) Foreign Application Priority Data

Oct. 29, 2003 (DE) ................................. 203 16 689
Jun. 9, 2004 (DE) .................... 20 2004 009 146 U (51) Int. Cl.
*F16J 15/34* (2006.01)
(52) U.S. Cl. ....................................... 415/230; 415/231
(58) Field of Classification Search ................. 415/230, 415/231
See application file for complete search history.

(56) References Cited

U.S. PATENT DOCUMENTS

| 4,561,679 A | 12/1985 | Choate |
| 6,132,168 A * | 10/2000 | Kovaleski et al. ............ 415/113 |

FOREIGN PATENT DOCUMENTS

| DE | 2 143 736 | 3/1971 |
| DE | 296 06 679 | 9/1997 |
| EP | 0 426 041 | 5/1991 |
| GB | 783881 | 10/1957 |
| JP | 54-030347 | 3/1979 |
| JP | 54135963 | 10/1979 |
| JP | 60155063 | 8/1985 |
| JP | 60155064 | 8/1985 |

* cited by examiner

*Primary Examiner*—Igor Kershteyn
(74) *Attorney, Agent, or Firm*—Bachman & LaPointe, P.C.

(57) ABSTRACT

A device which is used to guide at least two flow media having different pressures with a shaft or similar force-transmitting element, and a pressure insulating element such as a housing surrounding the shaft or similar. Areas arranged next to each other in the direction of the axis are determined between the force-transmitting element and the pressure-insulating element by sealing elements; at least one of the preferably magnetofluidic sealing elements is leakage-free, and two areas for fluids (A, B) having different pressures flank an area for an auxiliary liquid (H), whereby said area is subdivided by a device into two partial areas for two different pressure areas. A conveying medium is allocated to the area at high pressure and ambient air is allocated to the area at low pressure. The auxiliary liquid (H) is a carrier oil of the magnetofluid, optionally a silicon oil, allocated to the sealing element.

46 Claims, 7 Drawing Sheets

DEVICE AND METHOD FOR GUIDING AT LEAST TWO FLOW MEDIA

BACKGROUND OF THE INVENTION

The invention relates to a device and method for guiding at least two flow media having different pressures.

The transmission of movements and forces through pressure-retaining boundary walls between two fluid systems such as gases and liquids having different pressures is conventionally achieved essentially by means of shaft seals and rod seals such as gland seals, sealing rings and sliding ring seals. Ambient air at ambient pressure is usually found on the low-pressure side. In vacuum systems, the ambient air is on the high-pressure side. In order to function in a trouble-free manner, the aforementioned types of seal require a certain leakage flow from the higher-pressure side to the low-pressure side, since these are contact seals which require a lubricant in order not to be damaged during operation.

In many applications, however, such a leakage is not desirable or is even forbidden because the fluid is toxic, has a bad odor or is explosive for example, or because a high vacuum has to be maintained. Dual systems using blocking media—for example dual-action sliding ring seals—make it possible to reduce the leakage or substitute the leakage of the pressurized fluid with the leakage of a less harmful blocking fluid.

Leakage-free systems are at present achieved essentially in accordance with three technical principles: canned motor, magnetic coupling and magnetofluidic seal.

In the case of a canned motor, the motor is part of the machine, apparatus or device, for example often used in a pump. The stator is positioned on the low-pressure side of the pump and is isolated from the high-pressure side by means of a non-magnetizable can. The rotor is located within the high-pressure side of the pump. The torque is transmitted in a contactless manner from the stator to the rotor via electromagnetic forces through the can.

The magnetic coupling which is also customary in pump engineering operates according to a similar principle, but instead of a stator winding on the low-pressure side of the pump there is an external rotor with an arrangement of permanent magnets, opposite which there is a corresponding arrangement of permanent magnets or an induction cage or ring on the rotor side. The external rotor is connected to a conventional motor which generates the torque, said torque being transmitted to the rotor—again in a contactless manner—via magnetic field lines. The two coupling elements are usually insulated from one another in pressure terms by means of a cup-shaped housing element, a containment shroud.

In the design based on magnetofluid, a magnetizable liquid—usually a dispersion of very fine ferromagnetic particles using an auxiliary material in a carrier oil—forms an extremely flexible and adaptable impermeable sealing element, e.g. in the form of a "liquid O-ring" between shaft and housing, which is fixed at the location of the gap to be sealed by means of a suitably configured magnetic field. This type of seal is used commercially for example in hard drives and vacuum systems in surface technology.

Said leakage-free types of seal have a number of disadvantages in particular for pump engineering; both canned motors and magnetic couplings require bearing elements for the rotor bearing, which bearing elements have to be lubricated by the conveying medium of the pump itself and thus are very susceptible to faults. The advantage of magnetic coupling, namely the ability to use standard motors, is not obtained in the case of a canned motor. By contrast, the magnetic coupling has the disadvantage that, if different powers have to be transmitted, not only is it necessary to use different motors, but also different-sized couplings also have to be used in order for it not to be necessary to take into account any price disadvantage in the case of small powers. At high powers, both principles are limited by the type of torque transmission and the bearing system in terms of their ability to be used to transmit power, due to the overproportionally increasing cost. High eddy current losses which are induced in cans and containment shrouds of conventional type made of non-magnetic metal alloys are particularly disadvantageous.

The usability of magnetofluidic seals is limited to small pressure differences. By way of example, in order to seal 1 bar with respect to vacuum, six sealing elements connected one behind the other are required. However, the customary pressure range for single-stage centrifugal pumps extends up to 25 bar, and goes far beyond this for special applications and other pump systems. Moreover, the chemical compatibility and mixing processes between the fluids involved and the magnetofluid have to be taken into account.

Knowing these conditions, the inventor set himself the aim of providing a leakage-free system in a device of the type mentioned above, which eliminates the aforementioned disadvantages and also permits the transmission of very high powers between areas with high pressure differences—preferably at least 25 bar—without requiring any lubrication of the bearings by one of the fluids involved. Moreover, the invention is also intended to be more cost-effective and easier to use than devices according to the prior art.

SUMMARY OF THE INVENTION

According to the invention, sealing means or sealing elements are arranged between a force-transmitting member, for example a shaft, and a pressure-insulating element, such as a housing or similar, in such a way that three areas—which in particular lie next to one another in the direction of the axis—are formed: one area with a first fluid having a certain pressure (for example a conveying medium at 25 bar), one area for a second fluid having a pressure different to that of the first fluid (for example ambient air at 1 bar absolute), and a third area arranged between said areas for an auxiliary medium or auxiliary liquid. This latter area is subdivided by means of a device into two partial areas for two different pressure regions.

The auxiliary liquid may be for example a silicone oil, which is also used as the carrier oil of a magnetofluid; this is because it has proven advantageous to use magnetofluidic sealing means, in particular to delimit the area for the auxiliary liquid. This magnetofluidic seal hermetically seals the area.

Located in the area comprising the auxiliary liquid or auxiliary fluid are means which generate a pressure difference within this area, wherein the higher pressure is generated on the side toward the fluid having a higher pressure and vice versa. The pressure difference which can be generated must correspond at least to the maximum pressure difference which occurs between the first and second fluids.

Advantageously, a conveying medium should be assigned to the higher-pressure area and ambient air should be assigned to the low-pressure area. The auxiliary liquid should be a carrier oil of the magnetofluid assigned to the sealing element, optionally a silicone oil.

According to the invention, the area for the auxiliary liquid has two connections, one of which is designed to generate a vacuum and the other of which is designed as a passage for the auxiliary liquid. Moreover, the partial area for the higher pressure of the auxiliary liquid should be assigned to the area for the fluid having a higher pressure.

The subject matter of the invention is also characterized by geometric parts which can be moved relative to one another and are assigned to the pressure-insulating element and to the force-transmitting member, said parts forming a conveying device for the auxiliary liquid so as to generate a pressure difference. The device which divides the area for the auxiliary liquid is preferably a conveying device.

The pressure difference within the auxiliary liquid is advantageously generated by relative movements of geometric parts which are statically assigned to the force-transmitting member and to the pressure-insulating element (the housing), and form a conveyinq device, for example a pump, for the auxiliary liquid. Suitable measures, for example the provision of a non-return valve, in this case ensure that no pressure compensation between the high-pressure region and the low-pressure region of the auxiliary liquid takes place when the system is idle.

According to another feature of the invention, the pressure difference which can be generated corresponds at least to the maximum pressure difference which occurs between the fluids.

According to the invention, means are furthermore provided which react to the pressure difference between the fluid having the high pressure and the maximum pressure of the auxiliary liquid. According to the invention, the reaction is used to adjust said pressure difference to a value close to zero by suitable means. This may be effected for example by adjusting the power of the means which generate the pressure difference or by adjusting a return flow from the region of high pressure of the auxiliary liquid to the region of low pressure. There are members for adjusting the power of the means which generate the pressure difference or members for adjusting a return flow from the higher-pressure partial area of the auxiliary liquid to the low-pressure partial area.

Advantageously, a line with a valve-type overflow device is provided between the partial areas for the auxiliary liquid.

If, according to the invention, the volume of at least the area for the auxiliary liquid is designed to be variable, then in particular the partial area for the low pressure region of the auxiliary liquid may be configured with a variable volume. The ability to vary the volume of the area for the auxiliary liquid compensates for changes in the density and thus the volume of the auxiliary fluid—caused by changes in temperature or even pressure.

By configuring the area assigned to the auxiliary liquid such that it has a variable volume, it is possible to ensure according to the invention that the pressure difference between the minimum pressure of the auxiliary liquid and the pressure of the fluid having the lower pressure is also almost zero. This can be achieved for example by means of a flexible membrane between one side of the area for the auxiliary liquid and the fluid having the corresponding pressure, or—in a particularly advantageous manner—by arranging at least one magnetofluidic seal such that it can be moved. In an arrangement with ambient air at normal pressure (1 bar) on the low-pressure side, it is most advantageous to configure the area with a variable volume on this side.

Said means ensure that the magnetofluidic seals are subjected only to low pressure differences even in the event of high pressure differences between the first and second fluid, and thus their hermetic sealing effect is ensured. Force transmission takes place mechanically via the force-transmitting element, for example a shaft, so that high transmission powers are possible.

The magnetofluidic seal for the high-pressure side preferably consists of three sealing elements, represented by three permanent magnets magnetized in the direction of the axis, with associated ferromagnetic pole shoes which each generate a concentric magnetic field that fixes a ferrofluid as sealing medium. These are provided in a non-magnetic carrier ring. According to the invention, the carrier ring is fixed to the housing via a—preferably metallic—bellows. Said bellows is intended to bear against the carrier ring or lock ring and on the other side to bear against the pressure-carrying element. Easy assembly of the device is achieved by fixing the bellows to a bushing, which is sealed by an O-ring with respect to the housing and is fixed to the housing bushing by a threaded ring.

Within the context of the invention, the lock ring or carrier ring furthermore contains a sealing disk (advantageously molded from silicon carbide) which forms part of a mechanical sealing system consisting of two similar SiC disks. One of the disks has depressions in the contact face, said depressions having a depth of a few $\mu$m and running in a spiral manner from the outside toward the center of the disk in a manner corresponding to an axial spiral groove bearing which acts from the outside toward the inside; these depressions advantageously start from the disk edge and end at a distance from a central opening of the annular sealing disk. One function of said bellows is to movably mount the sealing disk in a manner assigned to the housing bushing, and thus to limit its conveying effect caused by the pressure difference.

If, during operation, the sealing disks generate a higher pressure than the pressure to be sealed off within the pump, the carrier ring with the associated sealing disk is moved in the direction of the pressure to be sealed off; the distance between the sealing disks becomes greater and consequently decreases the conveying effect. On the other hand, too low a pressure generated by the sealing disks leads to a reduction of the gap between the sealing disks and thus to an increase in the conveying effect.

It is within the scope of the invention that the means for achieving the sealing effect are in this case assigned to a shaft sleeve and a housing bushing. Shaft sleeve and housing bushing and also all parts in contact with the conveying fluid of the pump are made of non-magnetic materials which are sufficiently strong and chemically resistant to the conveying fluid. O-rings provide static sealing of the shaft sleeve with respect to the shaft and of the housing bushing with respect to the housing. The housing bushing can be fixed to the housing by means of screws. The hermetic seal is in this case formed in such a way that it can be installed and removed as a unit.

According to another feature of the invention, shaft sleeve and housing bushing are held at a defined axial spacing and such that they can rotate concentrically with respect to one another by means of roller bearings—for example by means of a double angular contact ball bearing. If necessary, the bearing is also suitable for absorbing axial forces acting on the shaft. To this end, the shaft sleeve must be fixed to the shaft for example by means of a securing ring or a shaft nut.

It has proven to be advantageous to fix the roller bearing in an annular space delimited by the shaft sleeve and the housing bushing. This roller bearing should be fixed in said annular space by means of securing rings of the housing bushing or shaft bushing and/or by means of a flange-like radial outer ring.

According to another feature of the invention, the roller bearing bears against an outer ring of the shaft sleeve, with one of the sealing disks made of silicon carbide being assigned to the other side thereof. Advantageously, one of the sealing disks is mounted in a section of the annular space which widens in steps in the axial direction away from the outer ring, with the lock ring comprising the other sealing disk being arranged in front of said section.

According to the invention, a radial gap runs between the outer face of the sealing disk and the adjacent lock ring, said radial gap optionally being adjoined on one side by an axial annular gap between the shaft and the sealing elements and on the other side by a further axial annular gap which passes below the adjacent sealing disk.

For the sake of better fixing, the sealing disk should moreover be connected to the center wall of the lock ring by means of at least one axis-parallel drive pin.

It is also important to the invention that a chamber which is partially filled with a gas, for example air or inert gas, may be arranged in front of the side of the device which is acted upon by a liquid as fluid, for example in front of the magnetofluidic sealing element on the carrier ring or lock ring, said chamber moreover being sealed off from the shaft on the side facing away from the device by means of a sealing gap of approximately 0.1 mm; the diameter of said sealing gap is selected to be greater than the diameter of the sealing gap of the magnetofluidic sealing element on the carrier ring but smaller than the diameter of the outer chamber wall.

According to the invention, the volume of the chamber and the widths of the sealing gaps are configured such that, when the arrangement is horizontal and the system is idle, and at ambient pressure inside the chamber, a certain residual gas volume is always present in the upper region of the chamber above the sealing gap of the chamber. During operation, this gas volume collects concentrically around the shaft in the region of smallest diameter of the shaft—in this case in the region of the sealing gap of the magnetofluidic seal, and is compressed to a smaller volume by means of the operating pressure. Even if the two volumes are of equal size, no gas should escape from the sealing gap of the chamber by suitably selecting the width of the latter. On the other hand, the second volume should be large enough to completely cover the sealing gap of the magnetofluidic seal during operation, even at maximum pressure. According to another feature of the invention, an advantageous width or diameter ratio between the sealing gap of the magnetofluidic seal, the sealing gap of the chamber and also the internal outer diameter of the latter is 1 to 1.2 to 1.5.

The arrangement ensures that the magnetofluidic seal, during operation, always comes into contact only with gas. Mixing of the magnetofluid with a liquid to be sealed off is thus effectively prevented.

In the case of liquids to be sealed off whereby no chemical reaction with air is to be expected or any reaction is harmless, the residual volume of air within the chamber can be used during filling of the pump. Otherwise, an auxiliary connection to the chamber is required, in order to fill it with an inert gas before the pump is started.

The invention thus encompasses a number of functional complexes which are associated with one another, namely firstly the areas with the hermetic seals and the auxiliary fluid, also means for generating the pressure difference, then the adjustment of the pressure difference by means of high pressure. It also encompasses the pressure compensation in the auxiliary fluid—the pressure difference with respect to low pressure—and also the described additional device for introducing gas.

Also within the scope of the invention is a method in which—particularly using the above-described device—between the force-transmitting member and the pressure-insulating element, fluids having different pressures are held in areas which are in each case delimited by a sealing element, and between said areas an auxiliary liquid or auxiliary fluid is held in an area; two different pressure regions are established in the latter, and moreover the partial area for the higher pressure of said auxiliary liquid is intended to be assigned to the area for the fluid having a higher pressure. The area for the auxiliary liquid is intended to be thermally sealed by means of magnetofluidic sealing elements on either side with respect to the areas for the fluids.

A further method step provides that the area for the auxiliary liquid is acted upon by a vacuum prior to the introduction of said liquid; the auxiliary liquid can thus fill all the hollow spaces within the device.

Moreover, a return flow from the higher-pressure partial area of the auxiliary liquid to the low-pressure partial area is to be adjusted.

The method according to the invention also comprises the fact that the pressure difference within the auxiliary liquid is generated by the relative movement of geometric elements which are assigned to the shaft on the one hand and to the pressure-insulating element on the other hand and form a conveying device.

According to another feature of the method, a conveying effect for the auxiliary liquid is created by means of sealing disks which between them delimit spiral grooves or depressions. The conveying effect of the sealing disks should be increased by increasing the pressure thereof and also the section with respect to one another.

Another feature of the method according to the invention provides that, in a chamber which is arranged in front of the sealing element and contains a gas, the gas volume during operation collects concentrically around the shaft in the region of the sealing gap between the sealing element and said shaft, and is compressed by means of the operating pressure.

In particular, the following details can be regarded as advantages of the system according to the invention:
- can be produced at low cost;
- no eddy current losses;
- can be installed as a cartridge;
- simple replacement possible;
- takes up a small amount of space;
- no sliding bearing required within the pump;
- axial force can be absorbed by the integrated roller bearing;
- use of cost-effective ferrite magnets is possible;
- can be used even for very high-power pumps;
- can easily be integrated in existing pump models.

BRIEF DESCRIPTION OF THE DRAWINGS

Further advantages, features and details of the invention emerge from the following description of preferred examples of embodiments and with reference to the drawing, in which.

DETAILED DESCRIPTION

Figure 7:
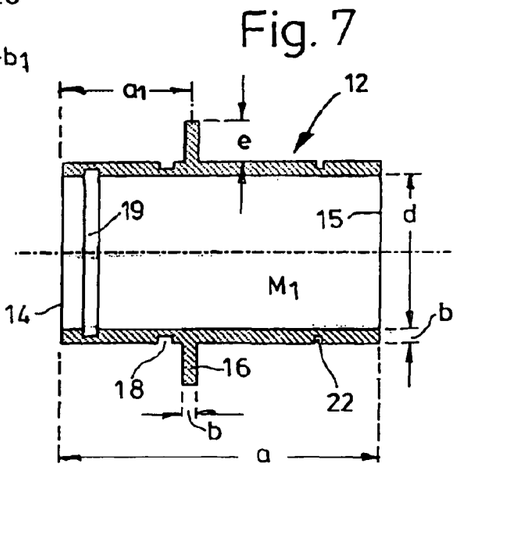
FIG. 7 shows a shaft sleeve of the sealing region, in longitudinal section.

A sealing region Q of the pump shaft 10 of a centrifugal pump (not shown in any greater detail) comprises a shaft sleeve 12 having a length a of 60 mm and an inner diameter d of in this case 30 mm, said shaft sleeve being coaxial with its longitudinal axis $M_1$ in relation to the longitudinal axis M of the pump shaft 10; the wall thickness b of the shaft sleeve 12 is 5 mm. At a central distance $a_1$ of approximately 25 mm from the front edge 14 of the shaft sleeve 12, there protrudes from the latter an integrally formed outer ring 16, as shown in FIG. 7, said outer ring having an identical wall thickness b and a collar length e of approximately 7 mm. An outer groove 18 for an O-ring 20 can be seen close to the outer ring 16; a further O-ring 20 is mounted in an inner groove 19 close to the front edge 14. A second outer groove 22 is located close to the illustrated rear edge 15 of the shaft sleeve 12, as a recess for a securing ring which will be described below.

The shaft sleeve 12 is surrounded by a coaxial housing bushing 26 of said length a, the inner diameter $d_1$ of which is in this case 68 mm with a wall thickness $b_1$ of again 5 mm. The O-rings 20 provide static sealing of the shaft sleeve 12 with respect to the pump shaft 10 and of the housing bushing 26 with respect to the pump housing. Moreover, the housing bushing 26 can be fixed to the housing by means of screws.

At a central distance $a_2$ of in this case approximately 20 mm from the front edge 28 of the housing bushing 26, there protrudes from the wall 30 thereof an integrally formed flange ring 32 having a diameter f of 100 mm and a width g of 10 mm, which contains (for example two) radial threaded bores 34 for plug screws 35 and also four axis-parallel openings 36 for connecting screws 38.

Figure 6:
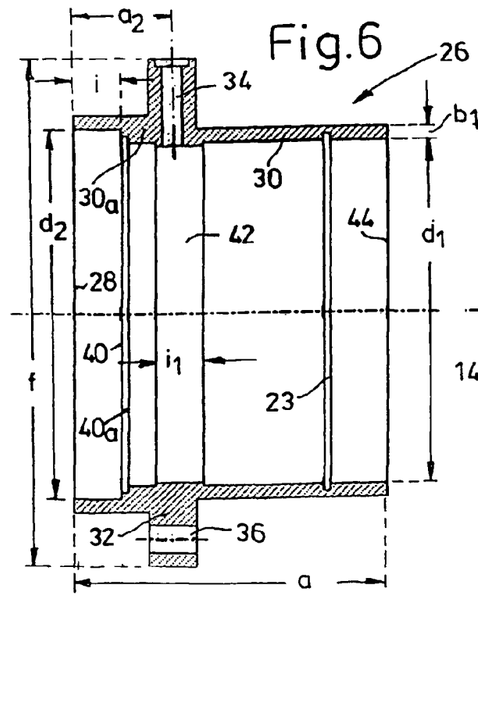
FIG. 6 shows a housing bushing of the sealing region, in longitudinal section.

At an axial distance i (approximately 10 mm) from said front edge 28, the wall 30 of the housing bushing 36 has two steps in the inward and axial direction. These two steps 40, 40$_a$, each having a small radial height, are necessary since the inner diameter $d_2$ of the front edge 28, at 73 mm, is greater than the diameter $d_1$ of 68 mm on the other side; the front edge 28 is offered by a wall section 30$a$ which adjoins said flange ring 32. In the region of this flange ring 32, an inner molded ring 42 having a small radial height and a width $i_2$ of 10 mm is molded out of the wall 30 (see FIG. 6).

Figure 1:
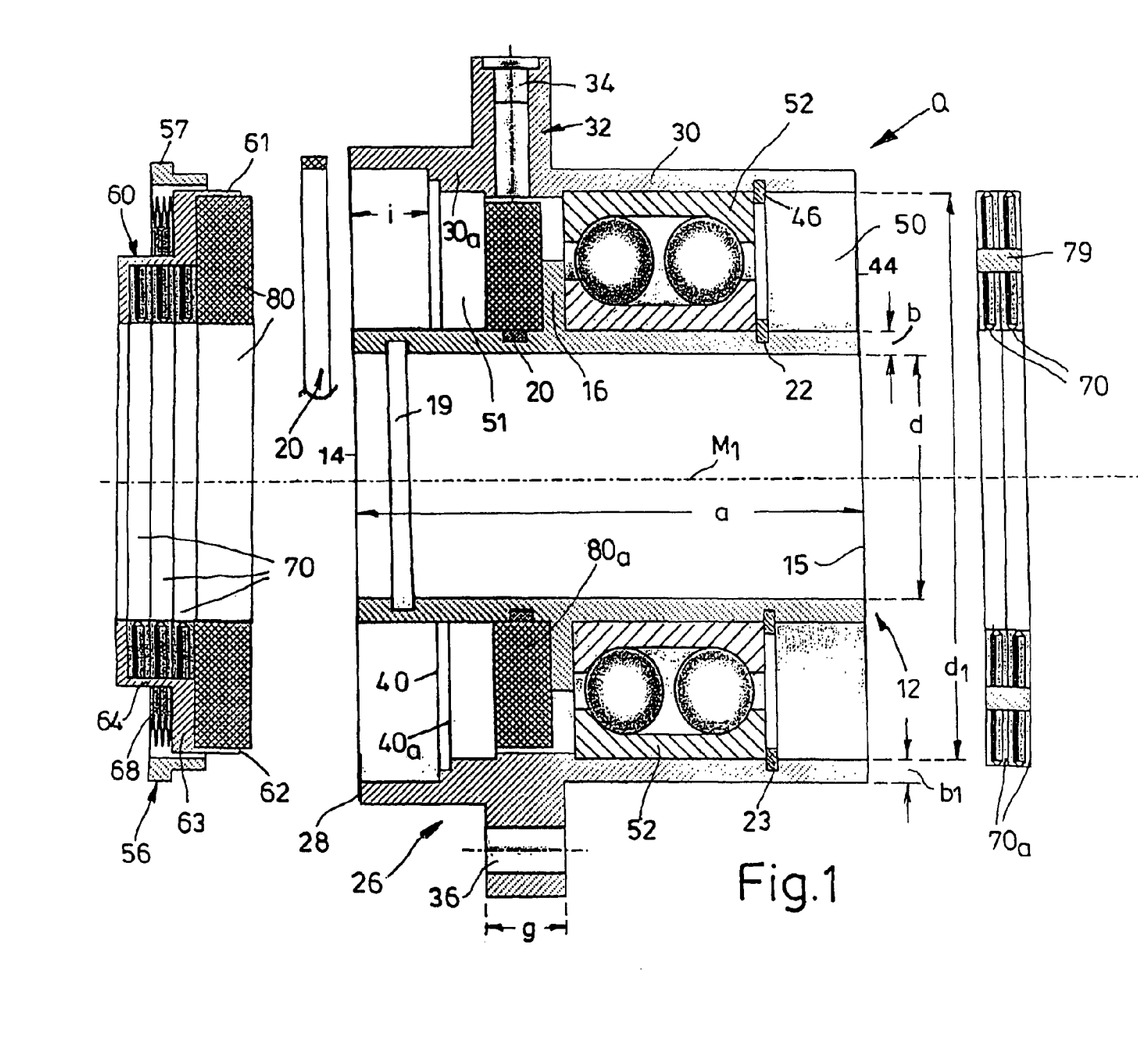
FIG. 1 shows a sealing region of a pump shaft, in longitudinal section, with a seal according to the invention, prior to assembly.

An inner groove 23 runs close to the rear edge 44 of the housing bushing 26, said inner groove lying opposite the abovementioned outer groove 22 of the shaft sleeve 12 and jointly holding with the latter a pair of securing rings 46, 46$_i$ which run in the cylindrical annular space 50 formed by the shaft sleeve 12 and the housing bushing 26; as shown in FIG. 1, said cylindrical annular space merges at the molded ring 42 into a stepped section 51 of the intermediate space between shaft housing 12 and housing bushing 26.

Between the securing rings 46, 46$_i$ and the outer ring 16 of the shaft housing 12, a roller bearing 52 is seated in the cylindrical annular space 50, for example a double angular contact ball bearing, which keeps the shaft sleeve 12 and the housing bushing 26 at a defined axial and radial spacing and such that they can rotate concentrically. To this end, the shaft sleeve 12 must be fixed on the shaft 10, for example by means of the inner securing ring 46$_i$ or a shaft nut.

Figures 2, 3, 4:
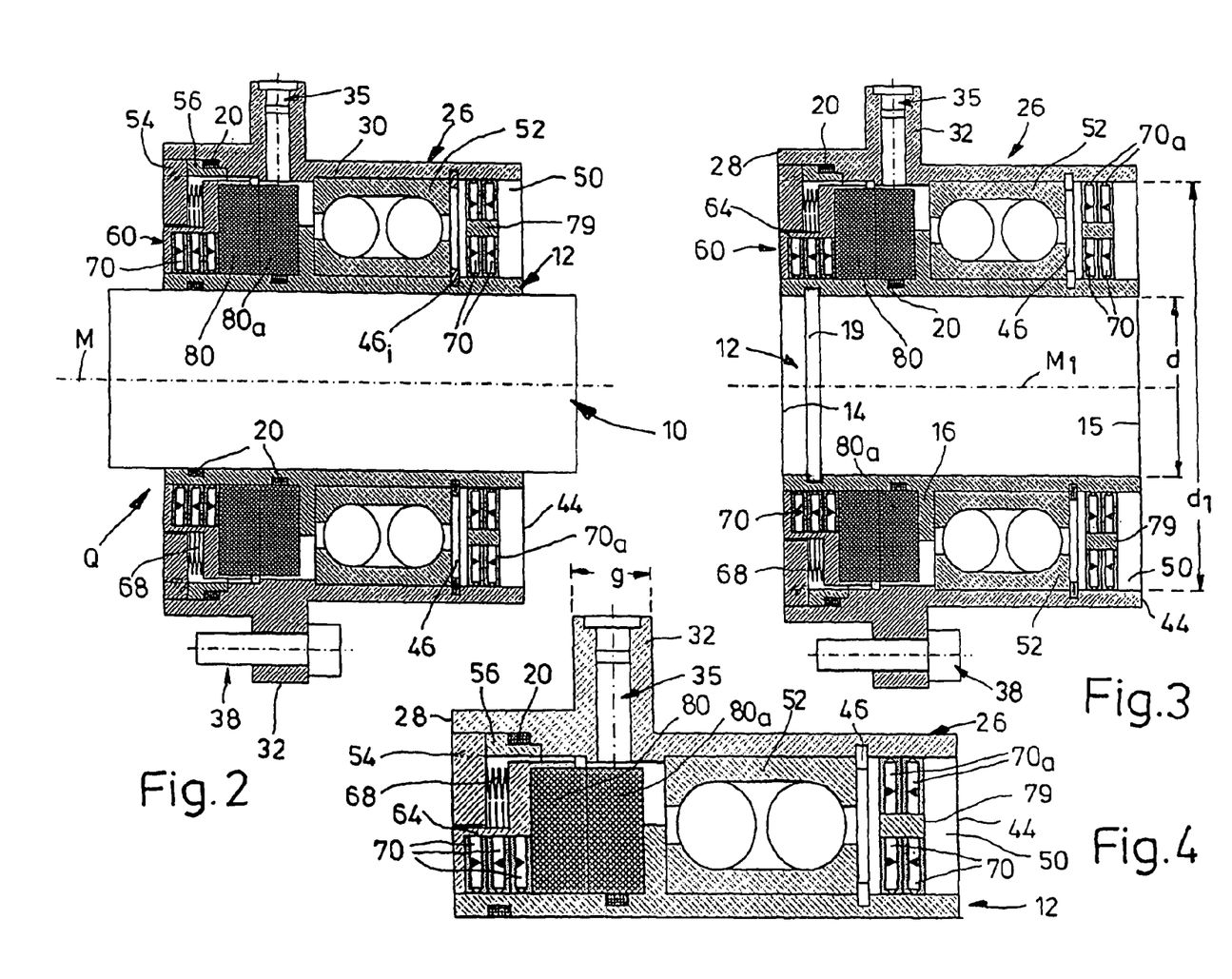
FIG. 2 shows the sealing region of FIG. 1 in the assembled state.
FIG. 3 shows the sealing region on a somewhat enlarged scale compared to FIG. 2, without the pump shaft.
FIG. 4 shows an enlarged detail from FIGS. 2, 3.
Figure 5:
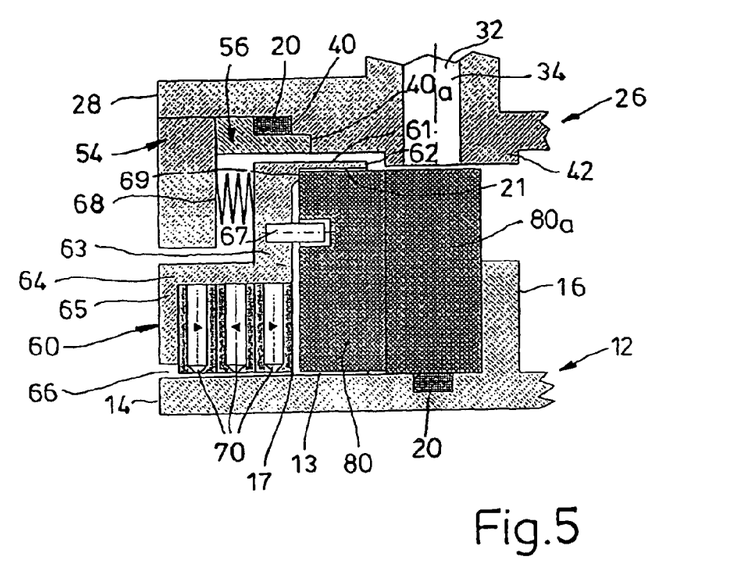
FIG. 5 shows an enlarged detail from FIG. 4 in a different embodiment.
Figures 8, 9:
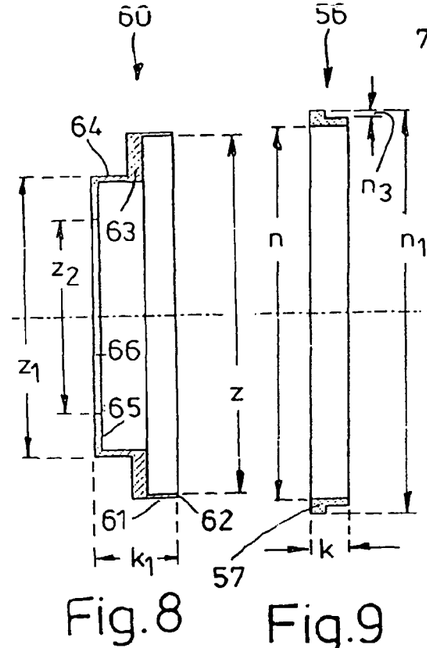
FIGS. 8 to 10 show diametral sections through different members of the sealing region which surround the shaft bushing.

FIGS. 1, 4, 5 in particular show that the abovementioned steps 40, 40$_a$ serve as a stop for a retaining ring 56, which is L-shaped in cross section, and an O-ring 20 which is held by said retaining ring; these rings are pushed axially into the stepped section 51 as shown in FIG. 1. The other step 40, which has an integrally formed outer ring 57 having a height $n_3$ of approximately 5 mm, lies at a distance opposite the retaining ring 56, which is pressed against the step 40$a$ by a front ring 54 surrounded by the front edge 28 and has an inner diameter n of 64 mm, an outer diameter $n_1$ of 74 mm and a width k of 7 mm, A carrier ring or lock ring 60 which has an axial width $k_1$ of 15 mm and two steps in the radial direction is fitted within the front ring 54 and the retaining ring 56, said carrier ring or lock ring having an axis-parallel outer wall 61 with an inner diameter z of 65 mm, as can clearly be seen from FIG. 8. Approximately in the center between the outer edge 62 of this outer wall 61 and a radial annular front wall 65 of the lock ring 60, the latter is stepped by means of a (likewise annular) radial central wall 63; integrally formed on the latter is an axis-parallel wall ring 64 having an outer diameter $z_1$ of 51 mm, and said front wall 65 is integrally formed on the latter. The diameter $z_2$ of the central opening 66 of the front wall 65 is 35 mm. The cross section of the retaining ring 56 thus consists of two angled sections, the outer section containing the outer wall 61 and the central wall 63; the latter is adjoined by the wall ring 64 of the inner angled section, which also comprises the front wall 65 and ends at the central opening 66.

Figure 10:
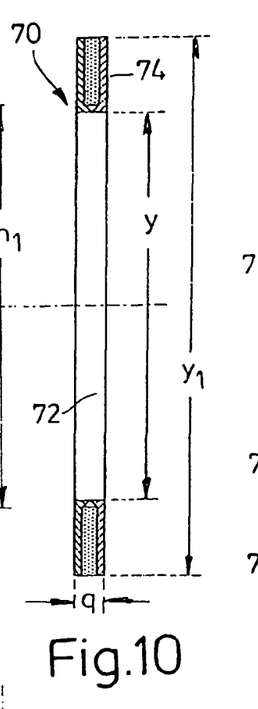
Figure 11:
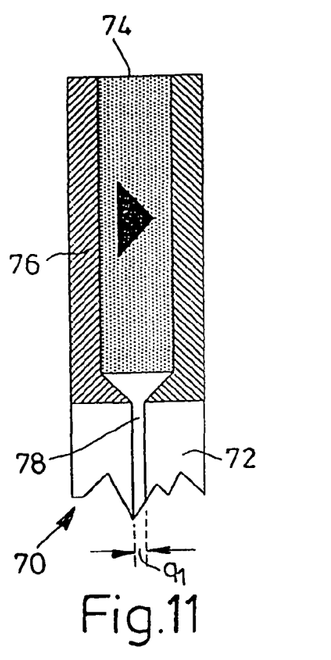
FIG. 11 shows an enlarged detail of FIG. 10.
Figure 16:
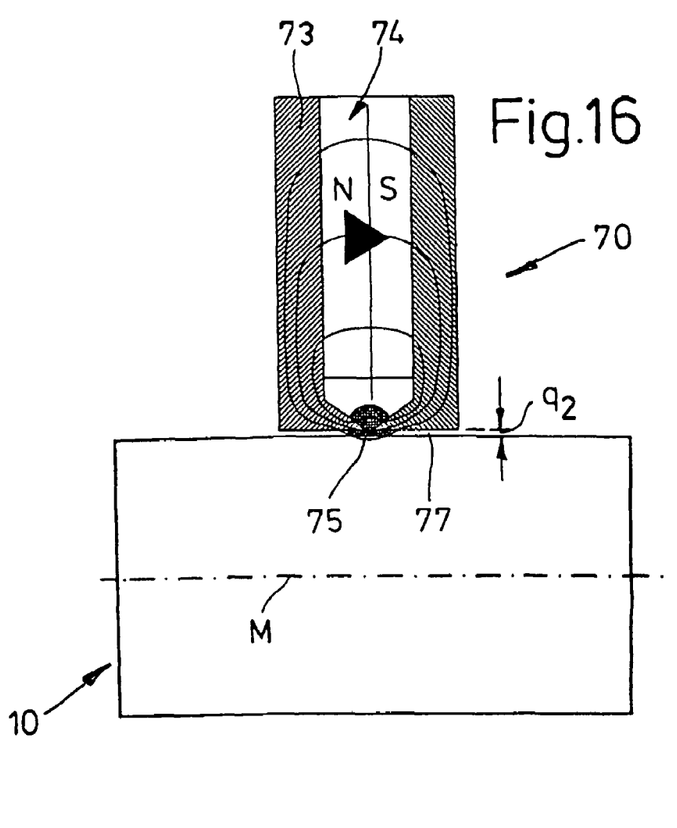
FIG. 16 shows a schematic diagram of a magnetofluidic seal.

Between the central wall 63 of the non-magnetic carrier ring or lock ring 60 and the aforementioned front ring 54, an annular, preferably metallic, bellows 68 can be seen, which is connected to the outer ring 57 and on the inside to the central wall 63 of the carrier ring 60. The latter is fixed in the housing bushing 26. Arranged within the wall ring 64 or the carrier ring 60 are three respectively annular magnetic seals 70, the structure of which can be seen in particular from FIGS. 10, 11. Their width q is approximately 3 mm, the inner diameter y of the ring opening 72 is approximately 35 mm and the outer diameter $y_1$ is in this case 50 mm. Reference 74 denotes a permanent magnet for a ferrofluid, which contains two pole shoes N, S as shown in FIG. 16, for example a ring which is U-shaped in cross section as shown in FIG. 11 at 76 and consists of at least two parts, as an iron limiter with a gap 78 having a width $q_1$ of approximately 0.1 mm which opens toward the ring opening 72.

The three sealing elements 70 form a magnetofluidic seal with respect to the high-pressure side and are three permanent magnets magnetized in the direction of the axis with associated ferromagnetic pole shoes N, S which each generate a concentrated magnetic field that fixes a ferrofluid as sealing medium. In order to make the device easier to assemble, the bellows 68 bears against the front ring 54 and with the retaining ring 56 is sealed with respect to the housing bushing 26 by means of an O-ring 20, which is fixed to the housing bushing 26 by means of the front ring 54 provided with an outer thread.

Two further magnetic seals 70 of the above-described type are arranged at the rear side of the securing rings 46. These magnetic seals 70 are surrounded by two corresponding magnetic seals 70$_a$ of different diameter, with a spacer ring 79 being arranged therebetween.

Figures 12, 13, 14:
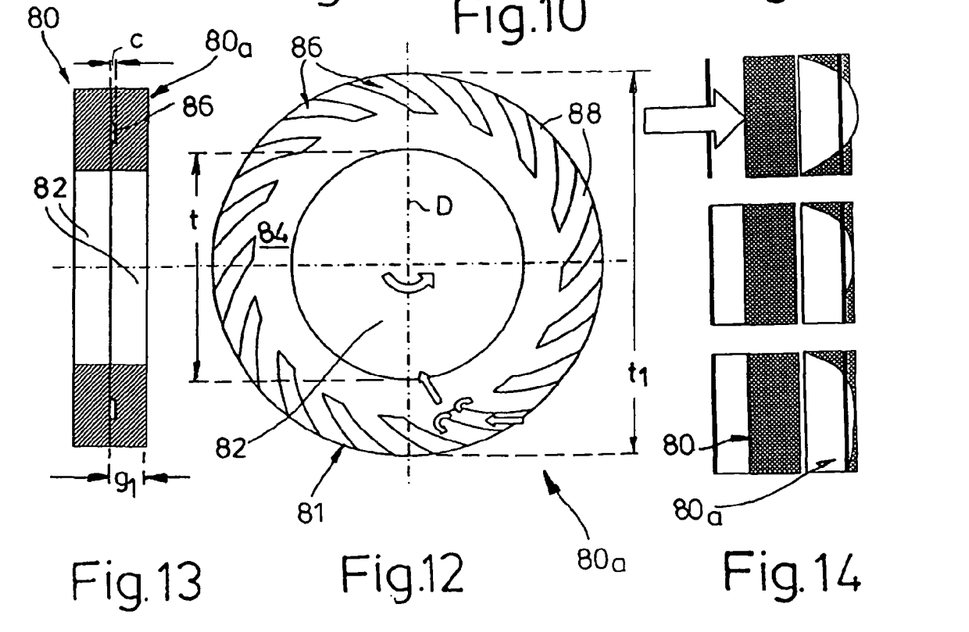
FIG. 12 shows a plan view of an annular sealing disk intended for the sealing region.
FIGS. 13, 14 show two diametral sections through a pair of sealing disks along line D in FIG. 12.

Said lock ring or carrier ring 60 furthermore contains a disk 80 made of silicon carbide which is shown schematically in FIGS. 12, 13, said disk forming part of a mechanical sealing system consisting of two similar SiC disks 80, $80_a$ having a width $g_1$ of approximately 7 mm, with a central opening 82 having a diameter t of approximately 39 mm. The outer diameter $t_1$ of the disk 80, $80_a$ is assumed to be approximately 65 mm. Here, sixteen spiral grooves 86, which start from the disk edge 81 and are curved in the shape of a segment of a circle when seen in plan view, are etched or ground into the front face or contact face 84 of the right-hand disk $80_a$ shown in FIGS. 1 to 5 and 13, in accordance with an axial spiral groove bearing acting from the outside toward the inside, said grooves 86 having a depth of 10 μm to 20 μm. These spiral grooves 86 end at a radial distance from the central opening 66 and are separated by correspondingly curved insulating ribs 88. The pump direction and the spiral grooves 86 are defined on the disk $80_a$ from the outside toward the center in FIG. 12.

The spiral grooves 86 may be formed both in the stationary and in the moving disk 80, $80_a$. The important thing is that the machined front face 84 of the other disk 80, $80_a$ lies directly opposite, so that the conveying effect is produced during operation.

The sealing elements 70 and the disk 80 in the carrier ring 60 are sealed with respect to the latter, e.g. tightly shrunk on. The second disk $80_a$ is arranged opposite the first disk on the shaft sleeve 12. FIG. 5 clearly shows an annular gap 13 between the disk 80 and the shaft sleeve 12. In the selected example of embodiment, the SiC disk $80_a$ is fixed by the outer ring 16 as a lateral stop and by an O-ring 20 which at the same time forms a seal with respect to the shaft sleeve 12 and causes it to be driven in rotation therewith. If necessary, rotation therewith can be assisted for example by means of a drive pin between stop 16 and SiC disk $80_a$. The opposite faces of the disks 80, $80_a$ are machined flat in the micrometer range and have a suitably fine depth of surface roughness. The bellows 68 of the carrier ring 60 ensures a mobility of the contact faces of the disks 80, $80_a$ with respect to one another in the axial direction at a distance of from zero to a few tenths of a millimeter. When the system is idle, the disks 80, $80_a$ are pressed together by means of the pressure difference to be sealed off, and thus the high-pressure side of the device is sealed off from the low-pressure side by means of the disks 80, $80_a$. As mentioned above, sealing elements 70 and sealing disk 80 on the carrier disk 60 are kept at a defined concentric distance of approximately 0.1 mm from the shaft sleeve 12 by means of the annular gap 13 (FIG. 5).

FIG. 14 is intended to illustrate the build-up of pressure due to the conveying effect between the two disks 80, $80_a$. The top diagram shows the build-up of pressure when only the left-hand disk 80 is subjected to a force and the pressure level on the outside and inside of the disk is the same (function as spiral groove axial bearing). The two diagrams therebelow show possible pressure gradients when the force is generated by a medium pressure on the left-hand disk 80 and a correspondingly higher pressure level on the inside of the disk, as is the case according to the invention. Depending on the pressure gradient, an additional measure for pressure adjustment as shown in FIG. 5 may be necessary, as will be explained below.

The magnetofluidic seal toward the atmosphere side consists of the four above-described sealing elements 70, $70_a$ which, as already mentioned, are arranged at the securing rings 46 in such a way that two elements 70 are directed toward the shaft sleeve 12 and two elements $70_a$ are directed toward the housing bushing 26. In this case, the magnetofluid not only has a sealing effect but also has a centering effect, so that the disk 80 with the sealing elements is freely movable in the axial direction between the shaft sleeve 12 and the housing bushing 26, which in this region lie concentrically and cylindrically with respect to one another. As a result, the volume in the region between the magnetofluidic seals is variable on the low-pressure side as required, and thus ensures a pressure difference heading toward zero between the low-pressure side of the auxiliary fluid and the environment.

Figure 15:
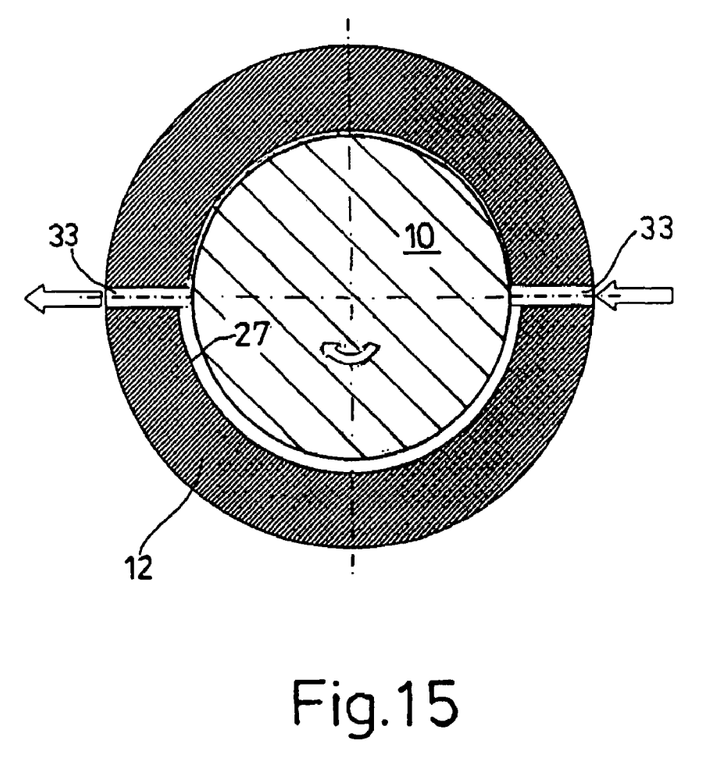
FIG. 15 shows a schematic cross section through part of the device.

FIG. 15 shows how the space between the magnetofluidic sealing elements 70 is advantageously filled with an auxiliary liquid by means of two connections 33—or the two threaded bores 35. While one connection 33 is used for the operation of filling with the auxiliary liquid, the other serves to subject the device to a vacuum beforehand, so that the auxiliary liquid fills all the hollow spaces within the device Q. By suitably arranging the connections 33 at the opposite sides of the annular space 27 in the housing bushing 26 which surrounds the sealing disk $80_a$ assigned to the shaft sleeve 12, it is possible for a pressure difference to be generated between the connections 33, which can be used to cause the device to be flowed through by auxiliary liquid from an external container during operation, e.g. for cooling purposes. This is achieved for example in that the annular space 27 has two different sides, and one of the sides of the annular space 27 is at a very small radial distance of in this case 0.1 mm from the disk 80 while the other side is at a greater distance of approximately 1 mm from the disk 80.

During operation, the SiC sealing disks 80, $80_a$ with the spiral grooves 86 confer a conveying effect with respect to one another on the auxiliary liquid, which creates between the low-pressure side and the high-pressure side of the device Q a pressure difference which corresponds to the conveying effect. The auxiliary liquid is selected in such a way that on the one hand good lubrication of the roller bearing 52 is ensured and the highest possible pressure difference can be produced via the sealing disks 80, $80_a$ (advantageously: high viscosity), and on the other hand the heating of the auxiliary liquid remains within controllable limits (max. approximately 80° C., advantageously: low viscosity). The auxiliary liquid is moreover selected in such a way that it is compatible with the magnetofluid of the seals 70, $70_a$; use may advantageously be made of the carrier oil of the magnetofluid (e.g. a silicone oil).

In order to prevent a "breakthrough" of the magnetofluidic seal on the high-pressure side due to overpressure (three rings withstand a pressure difference of max. approximately 0.5 bar), the conveying effect of the sealing disks 80, $80_a$ must be limited by the pressure difference bearing against the seal on the high-pressure side. This is achieved by the aforementioned mobility of the sealing disk 80 assigned to the housing bushing 26, by means of the bellows 68. If, during operation, the sealing disks 80, $80_a$ generate a higher pressure than the pressure to be sealed off within the pump, the carrier disk 60 with the associated sealing disk 80 is moved in the direction of the pressure to be sealed off: the distance between the sealing disks 80, $80_a$ becomes greater and consequently decreases the conveying effect. On the other hand, too low a pressure generated by the sealing disks 80, $80_a$ leads to a reduction of the gap between the sealing disks 80, $80_a$ and thus to an increase in the conveying effect.

In cases where the above-described self-adjustment effect between the sealing disks 80, $80_a$ is not sufficient, the adjustment can be assisted by means of an overcurrent function between the high-pressure and low-pressure region of the auxiliary liquid. In this case, the sealing disk 80 on the high-pressure side can be displaced axially within the carrier ring 60 and is arranged with radial air toward the outside—radial gap 17 between carrier ring 60 and sealing disk 80 of 0.1 mm in FIG. 5. In order to fix it to and drive it in rotation with the carrier ring 60, use is made of at least two drive pins 67, as shown in FIG. 5. At the outer end of the sealing disk 80, a radial stop face 69 delimits a sealing gap. The arrangement of the stop face 69 is selected in such a way that the sealing disk 80 lifts away from the carrier ring 60 and thus opens the sealing gap when the pressure between the sealing disk 80 and the carrier ring 60 is higher than the pressure of the fluid to be sealed off on the high-pressure side. An annular gap 21 runs in an axis-parallel manner from the stop face 69, said annular gap being delimited on one side by the outer wall 61 of the carrier ring 60 and on the other side by the circumference of the sealing disk 80 assigned to the housing bushing 26.

Particularly in applications where no chemically aggressive media are to be sealed off, there are various possibilities for reducing the costs of the design. For example, the functions of the shaft sleeve 12 and of the housing bushing 26 can be performed by shaft 10 and housing. The magnetofluidic seals can be produced in a cost-effective manner if the shaft 10 is made of ferromagnetic material, so that the magnetic field lines are guided through the shaft 10. As a result, arrangements are possible in which the magnetic field of a single permanent magnet is guided across a number of sealing gaps. However, the centering effect required on the low-pressure side is then no longer provided. By contrast, an instability exists, so that adaptation of the volume of the area for the auxiliary liquid must be achieved in some way other than that described. For simple applications, said sealing disks 80, $80_a$ made of SiC may be produced from more cost-effective materials and integrated in other components.

The illustrated principle for generating a pressure difference by means of sealing disks 80, $80_a$ with spiral grooves 86 is merely one possible embodiment. Other principles—such as conveying threads for example—are conceivable and possible.

The basic structure of a magnetofluidic seal can be seen in FIG. 16. The magnetic field of an annular permanent magnet 74 with axial magnetization is concentrated on an annular gap 77 around the shaft 10 by means of two pole shoes 73. The concentrated field keeps a magnetofluid 75 stationary in said annular gap 77, which thus gives rise to a sealing effect between the two sides of the structure.

Figure 17:
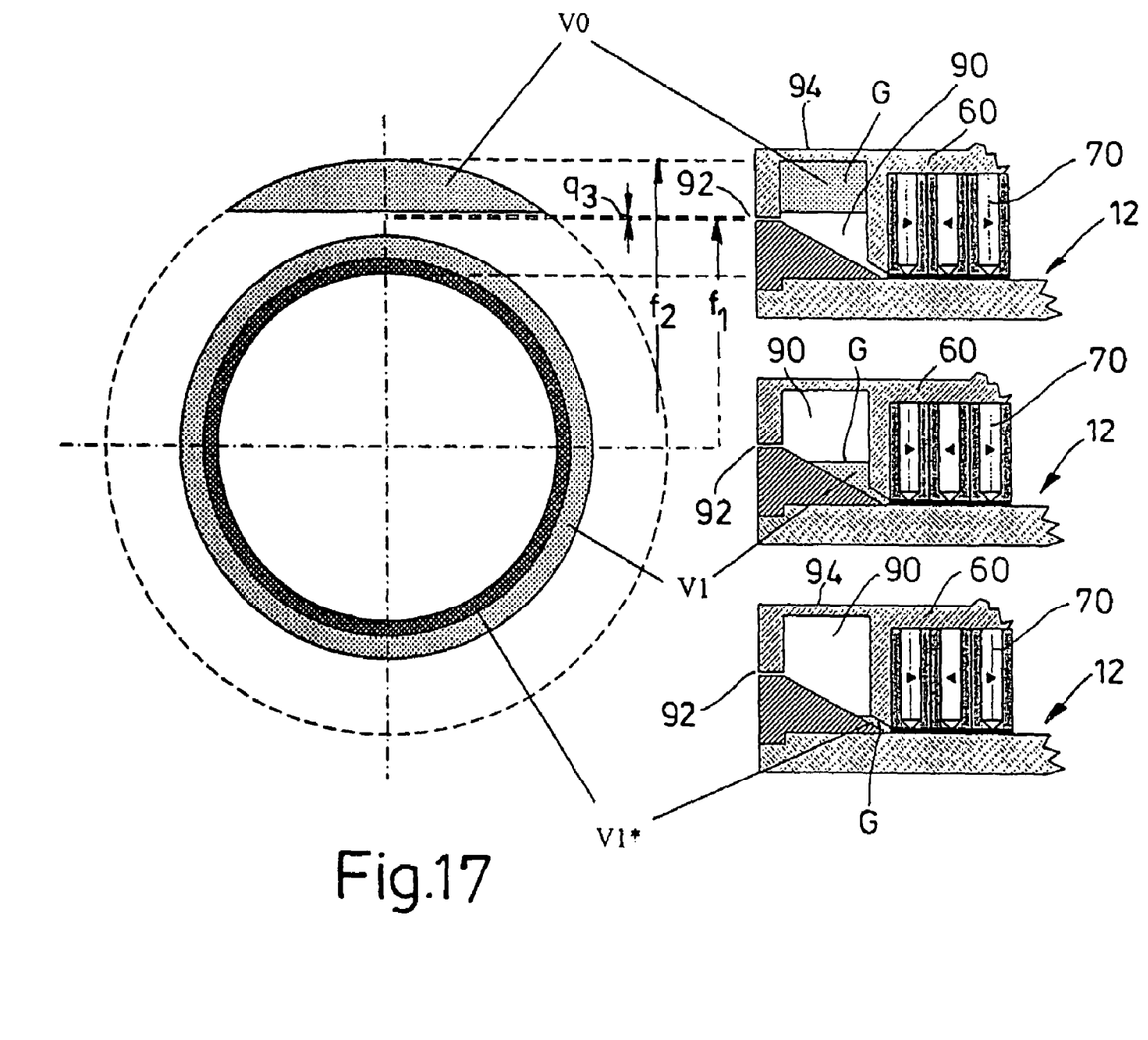
FIG. 17 shows a schematic assignment of cross sections with an additional device at different method stages.

In order to prevent any mixing between the liquid to be sealed off and the magnetofluid of the seal 70, the above-described device is supplemented as follows, as shown in FIG. 17.

A region, an area or a chamber 90 is arranged in front of the magnetofluidic seal 70 on the carrier ring 60, said chamber being partially filled with a gas G, for example air or an inert gas. On the side facing away from the device, the chamber 90 is sealed off with respect to the shaft 10 by means of an annular gap or sealing gap 92 having a width $q_3$ of approximately 0.1 mm, the diameter $f_1$ of which is greater than the diameter of the sealing gap 78 of the magnetofluidic seal 70 on the carrier ring 60 but smaller than the diameter $f_2$ of the outer chamber wall 94.

The volume of the chamber 90 and the diameters of the sealing gaps are configured such that, when the arrangement is horizontal and the system is idle, and at ambient pressure inside the chamber 90, a certain residual gas volume V0 is always present in the upper region of the chamber 90, above the sealing gap 92 thereof. During operation, this gas volume collects concentrically around the shaft 10 in the region of smallest diameter of the rotor—this is in the present case the sealing gap 77 of the magnetofluidic seal 70—and is compressed to a volume V1 by means of the operating pressure. Even if V1 is equal to V0, no gas should escape from the sealing gap 92 of the chamber 90 by suitably selecting the diameter $f_1$ of said sealing gap 92. On the other hand, V1 should be large enough to completely cover the sealing gap 77 of the magnetofluidic seal 70 during operation, even at maximum pressure. An advantageous diameter ratio between the sealing gap 77 of the magnetofluidic seal 70, the sealing gap 92 of the chamber 90 and the internal outer diameter of the chamber is 1 to 1.2 to 1.5. In FIG. 17, V1* denotes the gas volume at maximum pressure.

As already mentioned, the arrangement ensures that the magnetofluidic seal, during operation, always comes into contact only with gas. Mixing of the magnetofluid with a liquid to be sealed off is thus effectively prevented.

Figure 18:
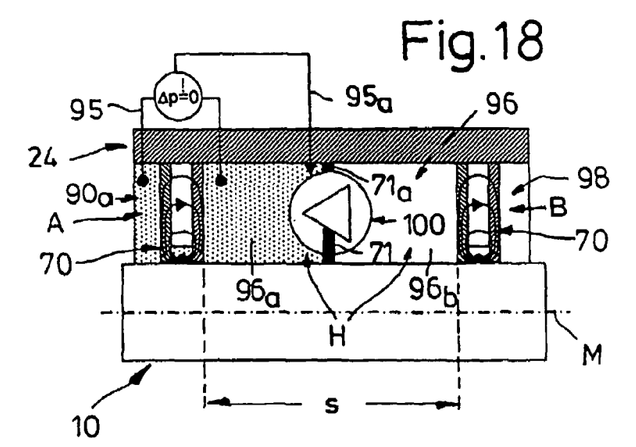
FIGS. 18 to 20 show three different sealing situations on the pump shaft, the latter being shown in side view.
Figure 19:
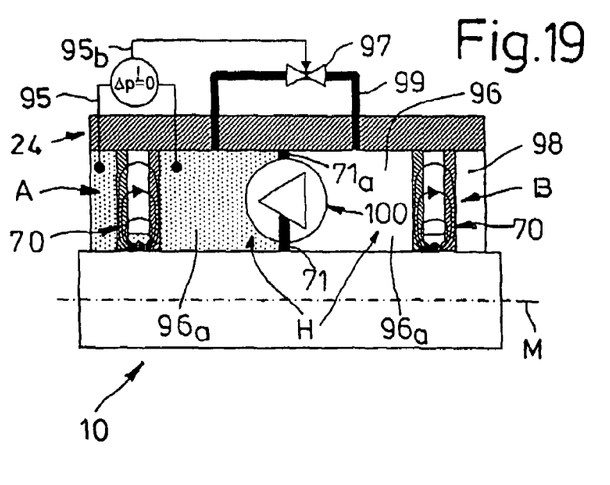
Figure 20:
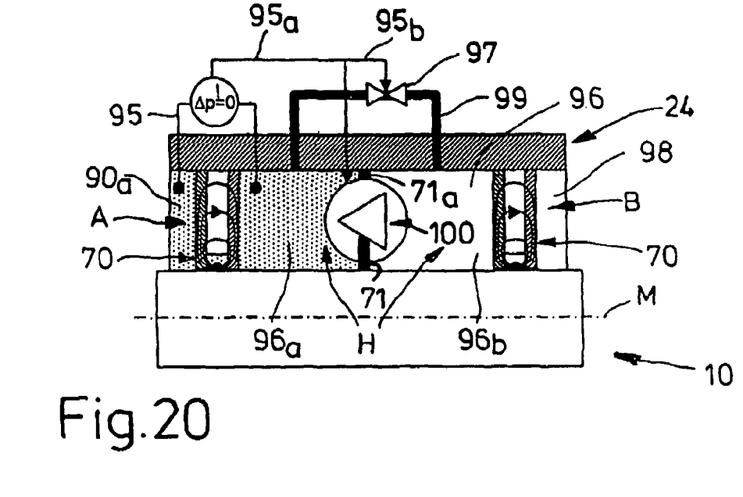

FIGS. 18 to 20 show in an abstract manner one principle of the invention concerning two magnetofluidic seals 70 which run at an axial distance s from one another, said seals being arranged on a shaft 10 and on a housing wall 24 (as pressure-insulating element) which runs parallel thereto, such that three regions or areas are formed: one area $90_a$ with a fluid A having a certain pressure that is to be sealed off (for example conveying medium at 25 bar), one area 96 with an auxiliary liquid H between the seals 70, and also an area 98 with a fluid B having a different pressure from fluid A (e.g. ambient air at 1 bar absolute). The middle area 96 is divided into two halves or sections $96_a$, $96_b$ by means of a conveying device 100, which is schematically shown as a pump symbol in the form of a circle with an inner triangle, for the means which generate a conveying effect and thus a pressure difference. The connection 71 of the circle to the housing side and the connection $71_a$ of the triangle to the shaft side symbolizes the assignment of the components of the conveying device to moving and stationary parts of the device.

The areas $90_a$, $96_a$ shown by dots illustrate regions of high pressure; the pressure difference between said areas is detected by suitable means (symbolized by the "measurement line" 95 and the symbol "deltaP=0!") and a signal (symbolized by the arrow line $95_a$) is generated for adjusting the conveying device 100 as a function of the pressure difference. Low pressure prevails in the dot-free areas $96_b$, 98.

In FIG. 18, the pressure adjustment takes place solely by adjusting the conveying device via the pressure difference (preferred solution). In addition to this, reference may be made to FIG. 4. FIG. 19 shows the pressure adjustment by means of an overcurrent device 97 (connected to said measurement line 95 by an arrow line $95_b$ and symbolized by an overcurrent valve), which is activated by the pressure difference and is located in a line 99 which connects the areas 96b and 98. FIG. 20 illustrates the combination of the two adjustment variants according to FIG. 5 of the specific embodiment.

Located in the region 96 containing the auxiliary liquid H are means which generate a pressure difference within this region 96, wherein the higher pressure is generated on the side of fluid A having the higher pressure and vice versa. The pressure difference which can be generated must correspond at least to the maximum pressure difference which occurs between fluid A and fluid B. There are also means which react to the pressure difference between fluid A having the higher pressure and the maximum pressure of the auxiliary liquid H. The reaction is used to adjust said pressure difference to a value close to zero, using suitable means. This may be effected for example by adjusting the power of the means which generate the pressure difference, or by adjusting a return flow from the high-pressure area $90_a$ of the auxiliary liquid H to the low-pressure area $96_b$.

By configuring the area assigned to the auxiliary liquid H such that it has a variable volume, it is possible to ensure that the pressure difference between the minimum pressure of the auxiliary liquid H and the pressure of the fluid B having the lower pressure is also almost zero. This can be achieved for example by means of a flexible membrane between one side of the area for the auxiliary liquid H and the fluid having the corresponding pressure, or by arranging one of the magnetofluidic seals 70 such that it can be moved. In an arrangement with ambient air at normal pressure (1 bar) on the low-pressure side, it is most advantageous to configure the area 96 with a variable volume on this side.

Said means ensure that the magnetofluidic seals 70 are subjected only to low pressure differences even in the event of high pressure differences between the fluids A, B, and thus their hermetic sealing function is ensured. Force transmission takes place mechanically via the force-transmitting element, for example the shaft 10, so that high transmission powers are possible.

The pressure difference within the auxiliary liquid H is generated for example by relative movement of geometric elements which are statically assigned to the shaft 10 and to the housing, and form a conveying device for the auxiliary liquid H. Suitable measures, for example the provision of said non-return valve, in this case ensure that no pressure compensation between the high-pressure area and the low-pressure area 96$_a$ and 96$_b$ of the auxiliary liquid H takes place when the system is idle.

The invention claimed is:

1. A device for guiding at least two flow media having different pressures, comprising a shaft or similar force-transmitting member and a pressure-insulating element surrounding the shaft or similar, characterized in that areas (90, 90$_a$; 96; 98) which lie next to one another in the direction of the axis are defined between the force-transmitting member (10) and the pressure-insulating element by sealing elements (70, 70$_a$), wherein at least one of the sealing elements (70, 70$_a$) is designed to be leakage-free and two areas (90, 90$_a$, 98) for fluids (A, B) having different pressures flank an area (96) for an auxiliary liquid (H), and a conveying device (100) for subdividing the latter area (96) into two partial areas (96$_a$, 96$_b$) defining two different pressure regions, the conveying device (100) is arranged within the partial areas for generating a pressure difference between the partial areas (96$_a$, 96$_b$).

2. The device as claimed in claim 1, wherein a magnetofluidic sealing element (70, 70$_a$) is provided for delimiting the area (96) for the auxiliary liquid (H).

3. The device as claimed in claim 1, wherein a conveying medium is assigned to the higher-pressure area (90$_a$) and ambient air is assigned to the low-pressure area (98).

4. The device as claimed in claim 2, wherein the auxiliary liquid (H) is a carrier oil of the magnetofluid assigned to the sealing element (70, 70$_a$), optionally a silicone oil.

5. The device as claimed in claim 1 wherein the area (96) for the auxiliary liquid (H) has two connections (33), one of which is designed to generate a vacuum and the other of which is designed as a passage for the auxiliary liquid (H).

6. The device as claimed in claim 1 wherein the partial area (96$_a$) for the higher pressure of the auxiliary liquid (H) is assigned to the area (90$_a$) for the fluid (A) having a higher pressure (FIGS. 18 to 20).

7. The device as claimed in claim 1, including geometric parts which can be moved relative to one another and are assigned to the pressure-insulating element and to the force-transmitting member (10), said parts forming a conveying device for the auxiliary liquid (H) so as to generate a pressure difference.

8. The device as claimed in claim 1, wherein the pressure difference which can be generated corresponds at least to the maximum pressure difference which occurs between the fluids (A, B).

9. The device as claimed in claim 8, including means for adjusting the pressure difference between the maximum pressure of the auxiliary liquid and the pressure of the fluid having the higher pressure to zero.

10. The device as claimed in claim 9, including members (97, 99) for adjusting a return flow from the higher-pressure partial area (96$_a$) of the auxiliary liquid (H) to the low-pressure partial area (96$_b$), wherein a line (99) with a valve-type overflow device (97) is optionally provided between the partial areas (96$_a$, 96$_b$) for the auxiliary liquid (H).

11. The device as claimed in claim 1, wherein the volume of at least the area (96) for the auxiliary liquid (H) is designed to be variable.

12. The device as claimed in claim 6, wherein at least the partial area (96$_b$) for the low-pressure region of the auxiliary liquid (H) is configured with a variable volume.

13. The device as claimed in claim 1, including membrane-type sealing elements for delimiting the area (96) for the auxiliary liquid (H).

14. The device as claimed in claim 13, wherein a magnetofluidic sealing element (70, 70$_a$) extends on either side of the area (96) for the auxiliary liquid (H) between the force-transmitting member (12) and the pressure-insulating element (24).

15. The device as claimed in claim 14, wherein the sealing element (70, 70$_a$) contains at least one permanent magnet (74) in a ring (76) and also a magnetofluid (75) assigned to the force-transmitting member or to the shaft (10) at an annular gap (77).

16. The device as claimed in claim 15, wherein the permanent magnet (74) forms part of a magnetic seal (70) which forms the sealing element, said magnetic seal surrounding the shaft (10) with the ring (76), wherein the magnetic field of the annular permanent magnet (70) is optionally concentrated on the annular gap (77) by associated pole shoes (73).

17. The device as claimed in claim 15, including permanent magnets (70) magnetized in the direction of the axis on the high-pressure side in a carrier ring or lock ring (60) made of non-magnetic material, or by at least two concentric magnetic seals (70, 70$_a$), the cross sections of which are separated by at least one axis-parallel spacer ring (79).

18. The device as claimed in claim 17, wherein a bellows (68) bears against the lock ring (60), said bellows bearing on the other side against the pressure-carrying element.

19. The device as claimed in claim 18, wherein the bellows (68) is made of metallic material and is preferably surrounded by a retaining ring (56) on its radial outer side, and/or is supported against a front ring (54) fixed to the housing bushing (26).

20. The device as claimed in claim 17, wherein the lock ring (60) contains at least one sealing disk (80) as part of a mechanical sealing system which comprises at least two sealing disks (80, 80$_a$) with a central opening (82), wherein the sealing disk (80, 80$_a$) is optionally molded from silicon carbide.

21. The device as claimed in claim 20, wherein the sealing disks (80, 80$_a$) bear against one another with contact faces (84), wherein optionally at least one sealing disk (80$_a$) has spiral grooves or depressions (86) of small depth (c) which run in a curved manner in the contact face (84) from the disk edge (81) toward the disk center, said grooves or depressions ending at a distance from the central opening (82) and being covered by the contact face of the other sealing disk (80).

22. The device as claimed in claim 1, wherein at least one shaft sleeve (12), which surrounds the shaft (10), and a housing bushing (26) which is coaxial thereto are in each case made of a non-magnetic material, and at least two of the magnetofluidic sealing elements (70, 70$_a$) which surround the shaft are provided between said shaft sleeve and said housing bushing.

23. The device as claimed in claim 22, wherein O-rings (20) provide static sealing of the shaft sleeve (12) with respect to the shaft (12) and of the housing bushing (26) with respect to the housing.

24. The device as claimed in claim 22 wherein the force-transmitting member or the shaft sleeve (12) and the pressure-insulating element or the housing bushing (26) are held at a defined axial spacing and such that they can rotate concentrically by roller bearings (52) arranged radially with respect to the longitudinal axis (M$_1$) of the shaft sleeve.

25. The device as claimed in claim 24, wherein the roller bearing (52) bears against an outer ring (16) of the shaft sleeve (12), with one of the sealing disks (80$_a$) made of silicon carbide being assigned to the other side thereof.

26. The device as claimed in claim 20, wherein one sealing disk (80$_a$) is mounted in a section (51) of the annular space (50) which widens in steps in the axial direction away from the outer ring (16), said section being assigned the lock ring (60) comprising the other sealing disk (80).

27. The device as claimed in claim 2, wherein a shaft (10) made of ferromagnetic material.

28. The device as claimed in claim 20, wherein a radial gap (17) runs between the outer face of the sealing disk (80) and the adjacent lock ring (60).

29. The device as claimed in claim 28, wherein the radial gap (17) is adjoined on one side by an axial annular gap (77) between the shaft (10) and the sealing elements (70) and on the other side by an axial annular gap (13) which passes below the adjacent sealing disk (80), and/or in that a stop face (69) is provided at the radially outer end of the radial gap (17), said stop face being adjoined by an outer annular gap (21) which runs in an axis-parallel manner (FIG. 5).

30. The device as claimed in claim 29, wherein the sealing disk (80) is connected to the center wall (63) of the lock ring (60) by at least one axis-parallel drive pin (67).

31. The device as claimed in claim 1, wherein a chamber (90) which is partially filled with a gas (G) and is provided with a sealing gap (92) is arranged in front of the side acted upon by a fluid.

32. The device as claimed in claim 31, wherein the chamber (90) which is partially filled with a gas (G) and is provided with a sealing gap (92) is arranged in front of the magnetofluidic sealing element (70) on the carrier ring or lock ring (60) (FIG. 17).

33. The device as claimed in claim 31 wherein a width (q$_3$) of the sealing gap (92) is greater than a width (q$_2$) of the sealing element (70) of the sealing gap (77) on the carrier ring or lock ring (60) with respect to the shaft (10), wherein optionally the ratio between the width (q$_2$) of the sealing gap (77), the width (q$_3$) of the sealing gap (77) of the chamber (90) and also the internal outer diameter (f$_2$) of the chamber (90) or the outer chamber wall (94) is 1 to 1.2 to 1.5.

34. The device as claimed in claim 31, wherein a cross section of the chamber (90) is widened toward the outside (FIG. 17).

35. The device as claimed in claim 31, wherein an auxiliary connection for inert gas is assigned to the chamber (90).

36. A method for guiding at least two flow media having different pressures, comprising a shaft or similar force-transmitting member and a pressure-insulating element surrounding the shaft or similar, by the device as claimed in claim 1, characterized in that, between the force-transmitting member (10) and the pressure-insulating element, fluids (A, B) having different pressures are held in areas (90, 90$_a$; 98) which are in each case delimited by a sealing element (70, 70$_a$), and between said areas at least one auxiliary liquid (H) is held in an area (96), wherein two different pressure regions are established in the latter and the partial area for the higher pressure of the auxiliary liquid (H) is assigned to the area (90$_a$) for the fluid (A) having a higher pressure.

37. The method as claimed in claim 36, including sealing the area (96) for the auxiliary liquid (H) by magnetofluidic sealing elements (70, 70$_a$) on either side with respect to the areas (90, 90$_a$; 98) for the fluids (A, B).

38. The method as claimed in claim 37, wherein the area (96) for the auxiliary liquid (H) is acted upon by a vacuum in front of said liquid.

39. The method as claimed in claim 36, wherein a conveying medium is assigned to the higher-pressure area (90, 90$_a$) and ambient air is assigned to the low-pressure area (98).

40. The method as claimed in claim 36, wherein the pressure difference which can be generated corresponds at least to the maximum pressure difference which occurs between the fluids (A, B), or adjusting the power of the means for generating the pressure difference.

41. The method as claimed in claim 36, wherein a return flow from the higher-pressure partial area (96$_a$) of the auxiliary liquid (H) to the low-pressure partial area (96$_b$) is adjusted.

42. The method as claimed in claim 36, wherein the pressure difference within the auxiliary liquid (H) is generated by the relative movement of geometric elements which are assigned to the shaft (10) on the one hand and to the pressure-insulating element on the other hand and form a conveying device (100).

43. The method as claimed in claim 36, wherein a conveying effect for the auxiliary liquid (H) is created by sealing disks (80, 80$_a$) which between them delimit spiral grooves or depressions (86), wherein optionally the conveying effect of the sealing disks (80, 80$_a$) is increased by increasing the pressure thereof and also the distance thereof with respect to one another.

44. The method as claimed in claim 36, wherein, in a chamber (90) which is arranged in front of the sealing element (70) and contains a gas, the gas volume during operation collects concentrically around the shaft (10) in the region of the sealing gap (77) between the sealing element and said shaft, and is compressed by the operating pressure.

45. A device for guiding at least two flow media having different pressures, comprising a shaft or similar force-transmitting member and a pressure-insulating element surrounding the shaft or similar, characterized in that areas (90, 90$_a$, 96; 98) which lie next to one another in the direction of the axis are defined between the force-transmitting member (10) and the pressure-insulating element by magnetofluidic sealing elements (70, 70$_a$), wherein at least one of the sealing elements (70, 70$_a$) is designed to be leakage-free and two areas (90, 90$_a$, 98) for fluids (A, B) having different pressures flank an area (96) for an auxiliary liquid (H), and a conveying device (100) for subdividing the latter area (96) into two partial areas (96$_a$, 96$_b$) defining two different pressure regions, the conveying device (100) is arranged within the partial areas for generating a pressure difference between the partial areas (96$_a$, 96$_b$), wherein the at least one magnetofluidic sealing element delimits the area (96) for the auxiliary liquid (H).

46. A device for guiding at least two flow media having different pressures, comprising a shaft or similar force-transmitting member and a pressure-insulating element surrounding the shaft or similar, characterized in that areas ($90$, $90_a$, $96$; $98$) which lie next to one another in the direction of the axis are defined between the force-transmitting member ($10$) and the pressure-insulating element by magnetofluidic sealing elements ($70$, $70_a$), wherein at least one of the magnetofluidic sealing elements ($70$, $70_a$) is designed to be leakage-free and two areas ($90$, $90_a$; $98$) for fluids (A, B) having different pressures flank an area ($96$) for an auxiliary liquid (H), and a conveying device ($100$) for subdividing the latter area ($96$) into two partial areas ($96_a$, $96_b$) defining two different pressure regions, the conveying device ($100$) is arranged within the partial areas for generating a pressure difference between the partial areas ($96_a$, $96_b$), wherein the at least one magnetofluidic sealing element delimits the area ($96$) for the auxiliary liquid (H) and wherein the pressure difference which is generated corresponds at least to the maximum pressure difference which occurs between the fluids (A, B).

* * * * *